Patented Oct. 19, 1937

2,096,140

UNITED STATES PATENT OFFICE 2,096,140

UNSYMMETRICAL INDIGOID DYESTUFFS

Robert Stocker, Basel, and Jakob Müller, Munchenstein, near Basel, Switzerland, assignors to Society of Chemical Industry in Basle, Basel, Switzerland No Drawing. Application July 3, 1936, Serial No. 88,894. In Switzerland July 10, 1935

3 Claims. (Cl. 260—53)

This invention relates to the manufacture of unsymmetrical indigoid vat-dyestuffs by condensing an 8-halogen-1:2-(3'-hydroxy-1'-thiophene)-naphthene or a reactive 2'-derivative thereof with a 2'-derivative of a 2:1-(3'-hydroxy 1'-thiophene)-naphthene or with a 2:1-(3'-hydroxy-1'-thiophene)-naphthene. As 2'-derivatives of these (3'-hydroxy-1'-thiophene)-naphthenes there may be used, for example, the halides, anils, ketones, carboxylic acids or oxims.

The condensation is best performed by heating the components together in a solvent or diluent, for instance in alcohol, glacial acetic acid, benzene or chlorobenzene.

The dyestuffs obtained may be converted by known methods into their leuco-ester salts and are suitable for dyeing and printing animal and vegetable fibers, for instance wool, silk, cotton, artificial silk from regenerated cellulose; the tints produced are very fast. A special value of these dyestuffs resides in the fact that their use leads to dyeings and prints which in addition to their excellent fastness have a blackish-brown tone, that is to say a tone which hitherto has been obtainable only with mixtures of vat-dyestuffs entailing the known disadvantages.

The following examples illustrate the invention, the parts being by weight:—

Example 1

234 parts of 8-chloro-1:2-(3'-hydroxy-1'-thiophene)-naphthene and 332 parts of para-dimethylamino-2'-anil of 2:1-(3'-hydroxy-1'-thiophene)-naphthene are together heated to boiling in 4000 parts of chlorobenzene for several hours. The dyestuff of the formula

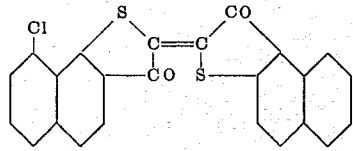

which separates in good yield is filtered, washed and dried. It is a dark brown powder, soluble in sulfuric acid to a violet-blue solution. It forms a greenish-yellow vat and dyes cotton and artificial silk from regenerated cellulose powerful blackish-brown tints of excellent fastness to chlorine, washing and light. The same color tint is obtained when the dyestuff is used for printing, for example, artificial silk from regenerated cellulose or cotton.

A dyestuff having similar properties is obtained by using the para-dimethylamino-2'-anil of such a 2:1-(3'-hydroxy-1'-thiophene)-naphthene which still carries substituents in the naphthalene nucleus, such as, for example, halogen or alkoxy groups.

Example 2

366 parts of para-dimethylamino-2'-anil of 8-chloro-1:2-(3'-hydroxy-1'-thiophene)-napthene and 332 parts of 2:1-(3'-hydroxy-1'-thiophene)-naphthene are together heated to boiling in 4000 parts of chlorobenzene until the condensation to dyestuff is complete. The mixture is filtered and the separated dyestuff washed with chlorobenzene and alcohol and dried. It is identical with that obtained as described in Example 1.

Example 3

279 parts of 8-bromo-1:2-(3'-hydroxy-1'-thiophene)-naphthene and 332 parts of para-dimethylamino-2'-anil of 2:1-(3'-hydroxy-1'-thiophene)-naphthene are together heated to boiling in 4000 parts of chlorobenzene until condensation is complete. After filtration and drying, the dyestuff of the formula

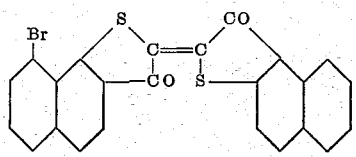

is a dark-brown powder soluble in concentrated sulfuric acid to a violet-blue solution and dyeing cotton in a greenish-yellow vat fast, powerful blackish-brown tints. The prints produced with the aid of this dyestuff are considerably blacker than those obtained by using the dyestuff of Examples 1 and 2.

The 8-bromo-1:2-(3'-hydroxy-1'-thiophene)-naphthene used in this example may be made as follows:—

By the action of phosphorus pentachloride on 8-bromo-naphthalene-1-sulfonic acid, the 8-bromo-naphthalene-1-sulfochloride is obtained; it crystallizes from benzine in lustrous laminae of melting point 102–103° C. By reduction with zinc it yields 8-bromo-1-mercaptonaphthalene, which crystallizes from benzene in lustrous laminae of melting point 109–110° C. By condensation with chloracetic acid the 8-bromonaphthalene-1-thioglycolic acid is obtained which crystallizes from alcohol in lustrous laminae of melting point 158° C. This body is converted by means of phosphorus trichloride into its acid chloride, and the latter is condensed by means of aluminium chloride. The 8-bromo-1:2-(3'-hydroxy-1'-thiophene)-naphthene forms olive-yellow needles and melts at 180–181° C.

What we claim is:—

1. Unsymmetrical indigoid dyestuffs of the general formula

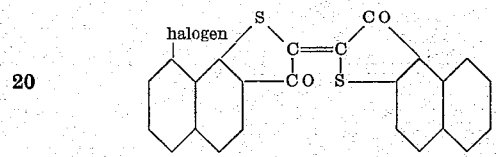

which dyestuffs are dark brown powders yielding in cotton printing blackish-brown tints of excellent fastness properties.

2. The unsymmetrical indigoid dyestuff of the formula

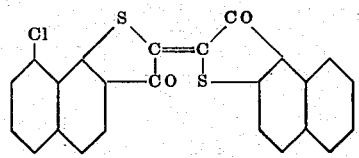

which dyestuff is a dark brown powder yielding in cotton printing blackish brown tints of excellent fastness properties.

3. The unsymmetrical indigoid dyestuff of the formula

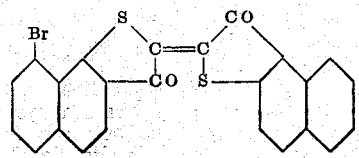

which dyestuff is a dark brown powder yielding in cotton printing blackish brown tints of excellent fastness properties.

ROBERT STOCKER.
JAKOB MÜLLER.